US008677466B1

(12) United States Patent
Chuang et al.

(10) Patent No.: US 8,677,466 B1
(45) Date of Patent: Mar. 18, 2014

(54) VERIFICATION OF DIGITAL CERTIFICATES USED FOR ENCRYPTED COMPUTER COMMUNICATIONS

(75) Inventors: Yung-Feng Chuang, Taipei (TW); Jin-Ning Yang, Taipei (TW)

(73) Assignee: Trend Micro Incorporated, Tokyo (JP)

(*) Notice: Subject to any disclaimer, the term of this patent is extended or adjusted under 35 U.S.C. 154(b) by 592 days.

(21) Appl. No.: 12/718,407

(22) Filed: Mar. 5, 2010

Related U.S. Application Data

(60) Provisional application No. 61/159,022, filed on Mar. 10, 2009.

(51) Int. Cl.
*G06F 21/00* (2013.01)
(52) U.S. Cl.
USPC ........ 726/9; 726/4; 726/6; 713/155; 713/156; 709/229
(58) Field of Classification Search
USPC ...................................... 713/155, 193; 726/9
See application file for complete search history.

(56) References Cited

U.S. PATENT DOCUMENTS

| | | | |
|---|---|---|---|
| 6,052,673 A | 4/2000 | Leon et al. | |
| 6,421,781 B1* | 7/2002 | Fox et al. | 726/4 |
| 6,535,855 B1 | 3/2003 | Cahill et al. | |
| 6,981,139 B2* | 12/2005 | Enokida | 713/156 |
| 7,685,631 B1* | 3/2010 | Paya et al. | 726/8 |
| 8,108,917 B2* | 1/2012 | Miyazawa | 726/6 |
| 8,307,413 B2* | 11/2012 | Smadja et al. | 726/9 |
| 2003/0037234 A1* | 2/2003 | Fu et al. | 713/158 |
| 2004/0019558 A1 | 1/2004 | McDonald et al. | |
| 2004/0030887 A1* | 2/2004 | Harrisville-Wolff et al. | 713/155 |
| 2004/0156372 A1 | 8/2004 | Hussa | |
| 2005/0050317 A1* | 3/2005 | Kramer et al. | 713/155 |
| 2005/0102522 A1* | 5/2005 | Kanda | 713/176 |
| 2006/0047965 A1* | 3/2006 | Thayer | 713/176 |
| 2006/0230272 A1* | 10/2006 | Lawrence et al. | 713/176 |
| 2006/0253458 A1 | 11/2006 | Dixon et al. | |
| 2006/0253578 A1 | 11/2006 | Dixon et al. | |
| 2006/0253580 A1 | 11/2006 | Dixon et al. | |
| 2006/0253581 A1 | 11/2006 | Dixon et al. | |
| 2006/0253582 A1 | 11/2006 | Dixon et al. | |
| 2006/0253583 A1 | 11/2006 | Dixon et al. | |
| 2006/0253584 A1 | 11/2006 | Dixon et al. | |
| 2007/0142030 A1 | 6/2007 | Sinha et al. | |
| 2009/0037976 A1* | 2/2009 | Teo et al. | 726/1 |
| 2010/0091994 A1* | 4/2010 | Schiefelbein | 380/277 |
| 2010/0146588 A1* | 6/2010 | Bergerson et al. | 726/3 |

OTHER PUBLICATIONS

Q10241—FAQ: What is SSL?, created on Jun. 7, 2005,1 sheet [retrieved on Sep. 3, 2008], retrieved from the internet: http://info.ssl.com/print.aspx?id=10241.

(Continued)

*Primary Examiner* — Morshed Mehedi
(74) *Attorney, Agent, or Firm* — Okamoto & Benedicto LLP

(57) ABSTRACT

A digital certificate may be extracted from communications between a web browser and a web server computer. The digital certificate may be verified independent of the web browser by comparing the digital certificate against contents of a database containing digital certificates of legitimate websites or by consulting a remotely located security server computer. For example, the digital certificate may be forwarded from a client computer running the web browser to the security server computer. The security server computer may obtain a digital certificate from the web server computer and compare it to the one received from the client computer to detect man-in-the-middle attacks, for example.

15 Claims, 3 Drawing Sheets

(56) References Cited

OTHER PUBLICATIONS

Man-in-the middle attack—from Wikipedia, the free encyclopedia, 3 sheets [retrieved on Sep. 3, 2008], retrieved from the internet: http://en.wikipedia.org/wiki/Man-in-the-middle_attack.

What is DHCP? Knowledge Base, University Information Technology Services, Indiana University, Sep. 11, 2007, 1 sheet [retrieved on Nov. 5, 2007], retrieved from the internet: <URL:http://kb.iu.edu/data/adov.html.

IEEE 802.11—from Wikipedia, the free encyclopedia, 9 sheets [retrieved on Nov. 5, 2007], retrieved from the internet: <URL:http://en.wikipedia.org/wiki/IEEE_802.11.

Wireless access point—from Wikipedia, the free encyclopedia, 3 sheets [retrieved on Nov. 5, 2007], retrieved from the internet: <URL:http://en.wikipedia.org/wiki/Wireless_access_point.

Intelligraphics—Introduction to IEEE 802.11, 1997, 6 sheets [retrieved on Nov. 6, 2007][retrieved from the internet: <URL:http://www.intelligraphics.com/articles/80211_article.html.

Packet (information technology)—Wikipedia, the free encyclopedia, 5 sheets [retrieved on Nov. 7, 2007] retrieved from the internet: <URL:http://en.wikipedia.org/wiki/Data_packet.

Ari Juels, et al. "Active Cookies for Browser Authentication" Feb. 2, 2006, 23 sheets, RSA Laboratories and RavenWhite Inc., University of Indiana, Bloomington.

Dynapass Dynamic Passwords—Features, Distributor of High-End LAN Oriented Products, 6 sheets, [retrieved on May 12, 2006], retrieved from the Internet<URL;http://www.cms.be/dynapass_features.htm>.

Man-in-the-middle attacks by Adv. Rohas Nagpal, 3 sheets, [retrieved on May 12, 2006], retrieved from the Internet: <URL:http://www.asianlaws.org/infosec/library/general/mim.htm>.

\* cited by examiner

VERIFICATION OF DIGITAL CERTIFICATES USED FOR ENCRYPTED COMPUTER COMMUNICATIONS

REFERENCE TO RELATED APPLICATION

This application claims the benefit of U.S. Provisional Application No. 61/159,022, filed on Mar. 10, 2009, which is incorporated herein by reference in its entirety.

BACKGROUND OF THE INVENTION

1. Field of the Invention

The present invention relates generally to computer security, and more particularly but not exclusively to methods and apparatus for providing secure computer communications.

2. Description of the Background Art

Secure Socket Layer (SSL) is a well known protocol for establishing an encrypted communication link between a web server and a web browser. A web server in compliance with SSL includes an SSL certificate issued by a trusted third party also known as a "certification authority." The SSL certificate serves as proof of the web server's identity and legitimacy. To initiate encrypted communication with the web server, a web browser retrieves the SSL certificate and performs an SSL chain verification process to authenticate the certificate. The verification process involves verifying that the web server is what it purports to be and that the web server is certified by the certification authority as legitimate (i.e., safe to communicate with). If the SSL certificate passes the verification process, the web browser will perform encrypted communication with the web server. In a nutshell, the web browser uses the web server's public key to encrypt data to be transmitted to the web server. The web server receives the encrypted data and decrypts it using the web server's private key. This provides a relatively secure way for the web browser to submit sensitive, confidential information (e.g., credit card information, personal information) to the web server.

If the SSL certificate does not pass the verification process, the web browser will so inform the user by displaying a warning page. However, the web browser gives the user the option to continue establishing encrypted communication with the web server even when the web server's SSL certificate does not pass verification. This is a dangerous situation because some users may continue the encrypted communication anyways for a variety of reasons, such as thinking that the problem is caused by a self-signed certificate that did not import into the local certificate store, social engineering of a cyber criminal to trick the user to accept an unverified SSL certificate, lack of general knowledge of cryptography, and no appreciation of the consequences of accepting an unverified SSL certificate.

SUMMARY

A digital certificate may be extracted from communications between a web browser and a web server computer. The digital certificate may be verified independent of the web browser by comparing the digital certificate against contents of a database containing digital certificates of legitimate websites or by consulting a remotely located security server computer. For example, the digital certificate may be forwarded from a client computer running the web browser to the security server computer. The security server computer may obtain a digital certificate from the web server computer and compare it to the one received from the client computer to detect man-in-the-middle attacks, for example.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Figure 1:
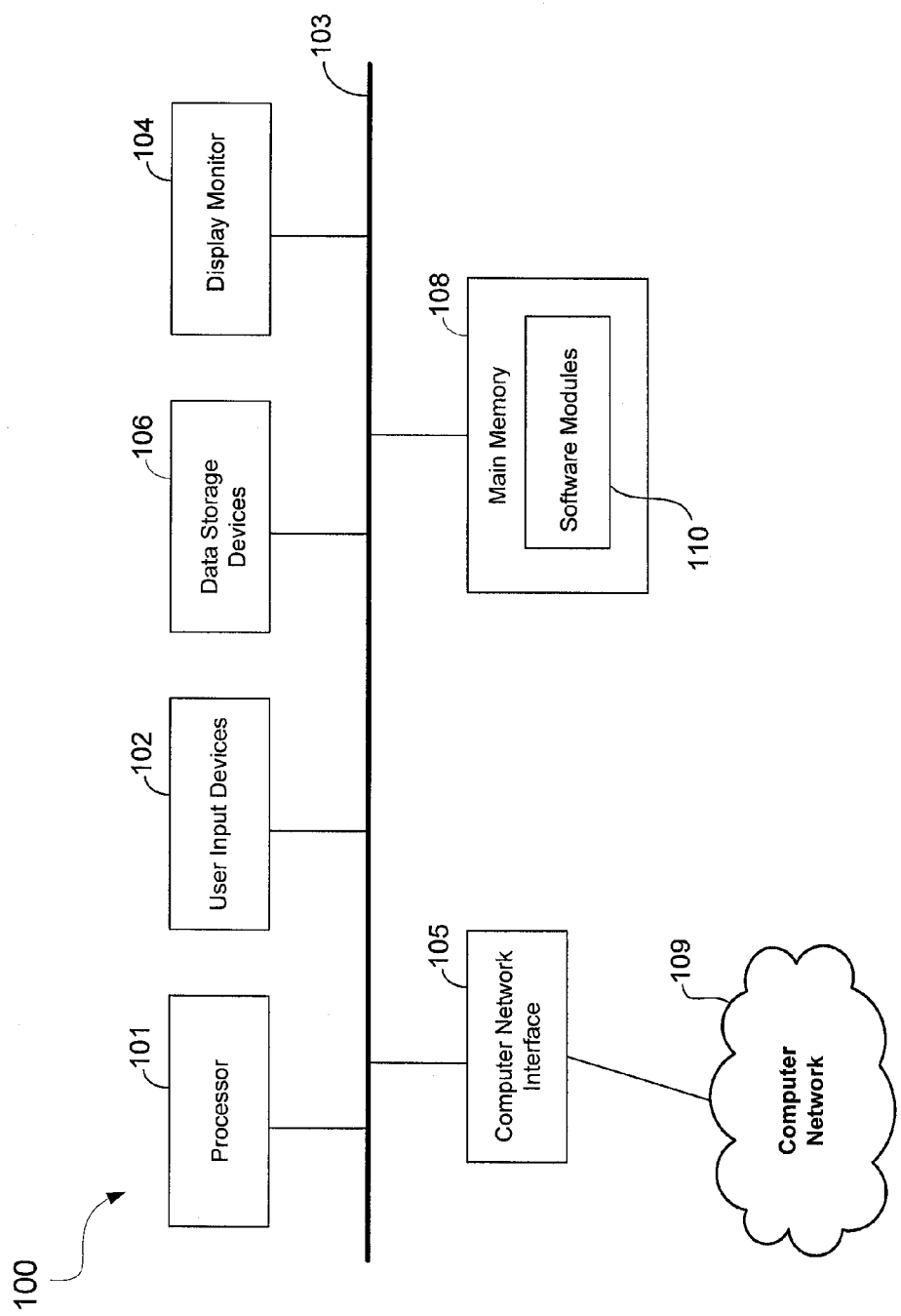
FIG. 1 shows a schematic diagram of a computer in accordance with an embodiment of the present invention.

Referring now to FIG. 1, there is shown a schematic diagram of a computer 100 in accordance with an embodiment of the present invention. The computer 100 may be employed as a client computer or a server computer, for example. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

Figure 2:
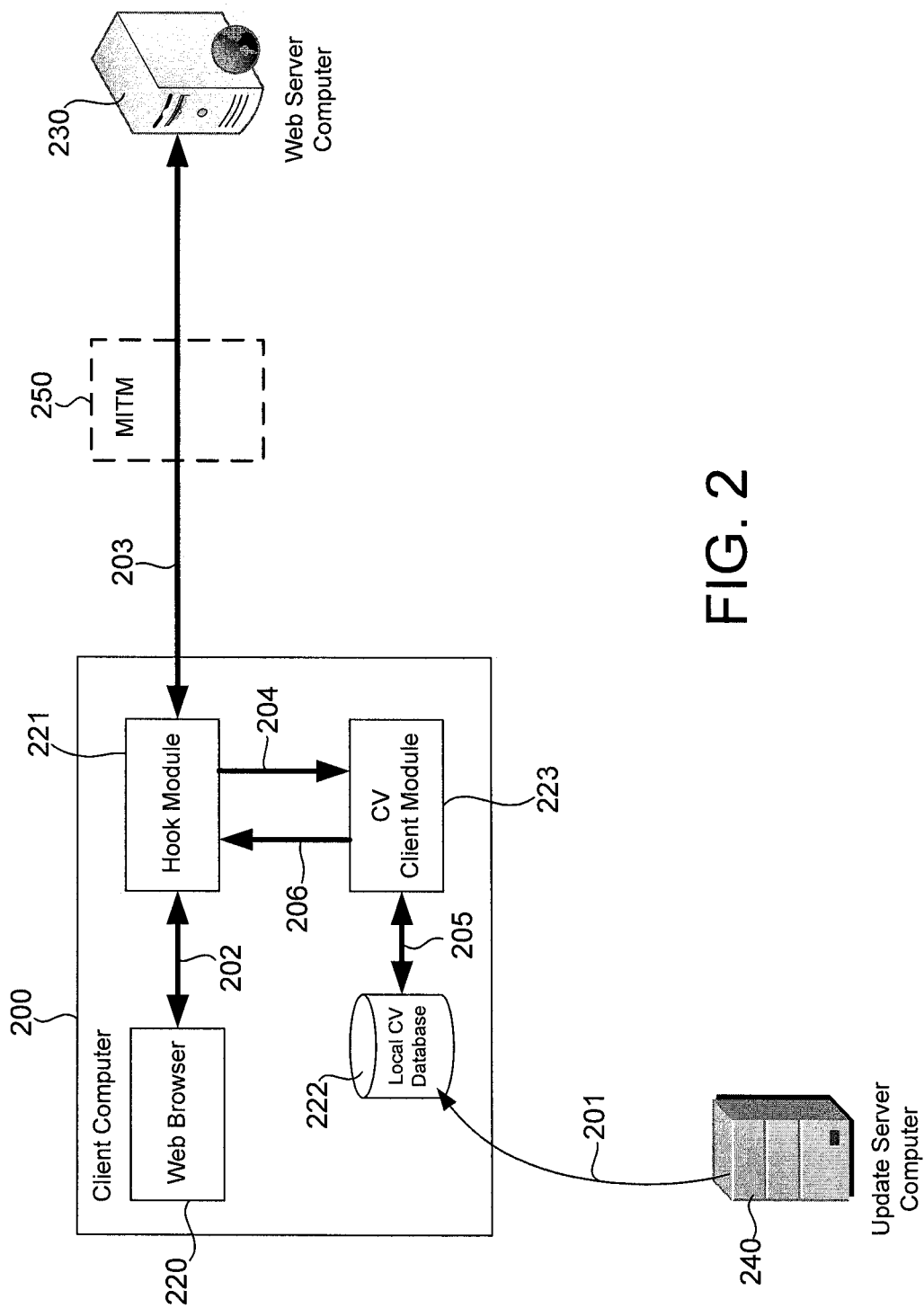
FIG. 2 schematically shows a computing environment in accordance with an embodiment of the present invention.
Figure 3:
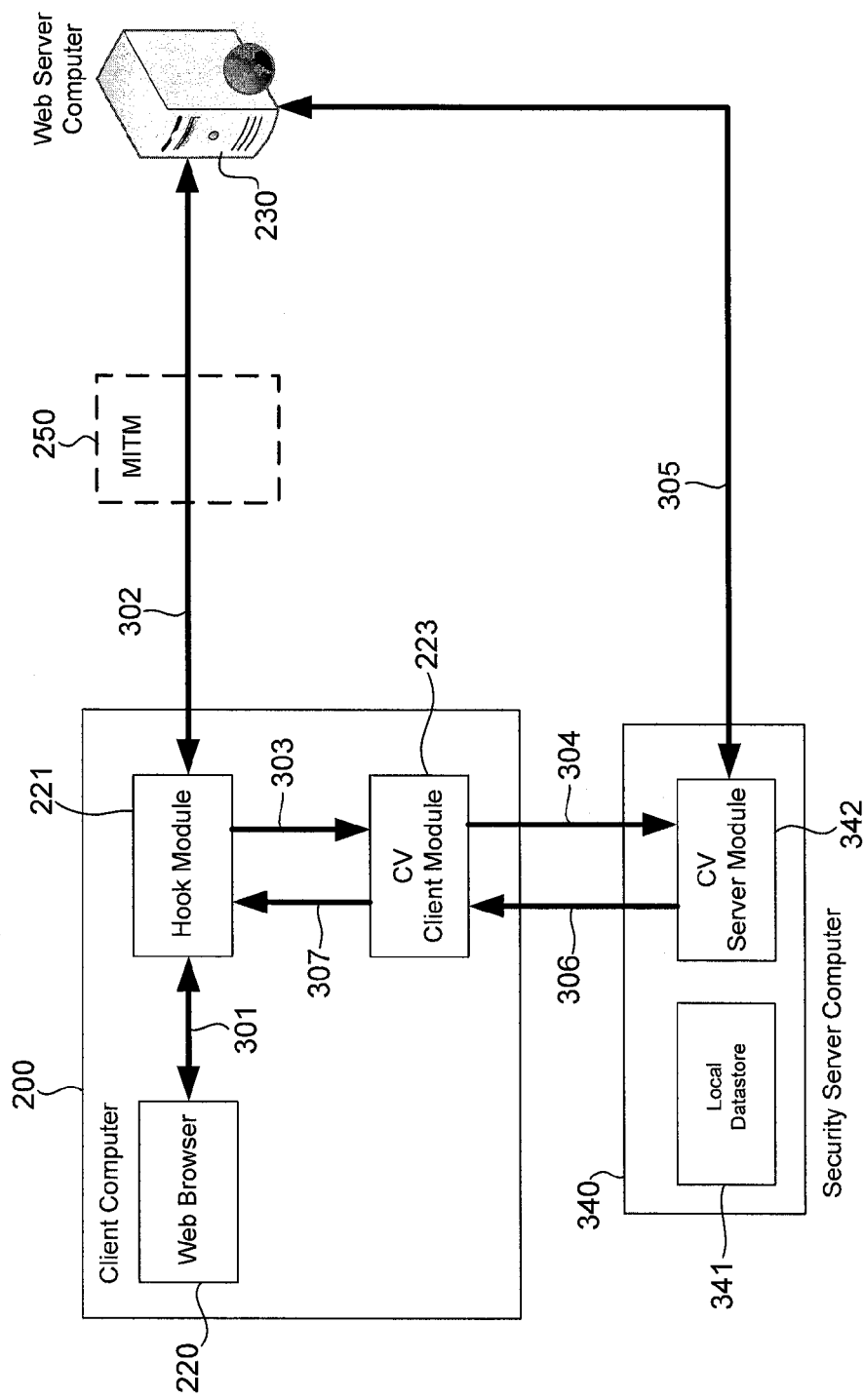
FIG. 3 schematically shows a computing environment in accordance with another embodiment of the present invention.

In the example of FIG. 1, the main memory 108 includes software modules 110, which may comprise computer-readable program code components of a client computer 200 (see FIGS. 2 and 3) or a security server computer 340 (see FIG. 3). The software modules 110 may be loaded from the data storage device 106 to the main memory 108 for execution by the processor 101.

FIG. 2 schematically shows a computing environment in accordance with an embodiment of the present invention. In the example of FIG. 2, the computing environment includes the client computer 200, a web server computer 230, and an update server computer 240. The aforementioned computers may communicate over the Internet.

The client computer 200 may comprise a user computer for communicating with web server computers and other computers accessible over a computer network including the Internet. In the example of FIG. 2, the client computer 200 includes a web browser 220, a hook module 221, a local certificate validation database 222, and a certificate validation client module 223. The hook module 221, the local certificate validation database 222, and the certificate validation client module 223 form a digital certificate verification system for encrypted communications.

The web browser 220 may comprise a commercially-available web browser, such as the Microsoft Internet Explorer™ web browser, for example.

The hook module 221 may comprise computer-readable program code for listening to and extracting information from encrypted communications between the web browser 220 and a remote computer, such as the web server computer 230. In one embodiment, the hook module 221 extracts a server's digital certificate, the server's IP (Internet Protocol) address, and the identity of the server and the client involved in the encrypted communication. The hook module 221 may be configured to provide the extracted information to the CV client module 223. In the example of FIGS. 2 and 3, the encrypted communication comprises an SSL communication and the server's digital certificate comprises an SSL certificate.

The CV client module 223 may comprise computer-readable program code for verifying a server computer's digital certificate. In the example of FIG. 2, the CV client module 223 is configured to verify a web server computer's SSL certificate by checking the SSL certificate against contents of a local CV database 222. The CV database 222 may contain certificate information of legitimate web server computers, such as those hosting popular websites (e.g., such as websites of online auction, online payment, banking etc.), frequented by the client computer 200, and/or in the same private computer network as the client computer 200. The CV database 222 may also contain certificate information manually entered by a network administrator. The certificate information stored in the database 222 may include the server certificate, server IP address, and server identity of legitimate web server computers and of web server computers manually entered by the network administrator. The database 222 may also include IP addresses and other server information of known malicious web server computers (e.g., web server computers hosting websites used for phishing, spoofing, spreading of malicious codes, and other fraudulent or criminal activity etc.).

In the example of FIG. 2, the CV client module 223 is configured to receive from the hook module 221 the certificate information (e.g., SSL certificate, server IP address, and server identity) of a web server computer communicating with the client computer 200. The CV client module 223 compares the certificate information against the contents of the local CV database 222 to verify the web server computer's SSL certificate. The CV client module 223 may also compare the IP address and server identity of the web server computer against IP addresses and server identities of malicious websites to determine if the web server computer is malicious.

In an example operation, the local CV database 222 may receive periodic updates from an update server computer 240 over a computer network (arrow 201), such as the Internet. The updates may contain the latest certificate information of legitimate web server computers and IP addresses or other information of known malicious websites. A user of the client computer 200 may employ the web browser 220 to surf the Internet and connect to a website hosted by the web server computer 230. The hook module 221 monitors the communication between the web browser 220 and the web server computer 230 (arrows 202 and 203). Before encrypted communication occurs between the web browser 220 and the web server computer 230, the web server computer 230 provides its SSL certificate to the web browser 220. The hook module 221 extracts the SSL certificate and other certificate information from communications between the web browser 220 and the web server computer 230. The hook module 221 provides the certificate information, which includes the SSL certificate of the web server computer 230, to the CV client module 223 (arrow 204).

To verify the SSL certificate, the CV client module 223 compares the certificate information against those in the local CV database 222 (arrow 205). For example, if the web server computer 230 is identifying itself as a particular legitimate website (e.g., Paypal® online payment site), the CV client module 223 may compare the certificate information of the web server computer 230 to those of the legitimate websites stored in the local CV database 222.

The CV client module 223 may also compare the IP address and server identity of the web server computer 230 against those of malicious websites stored in the local CV database 222 (arrow 205) to determine if the web server computer 230 is malicious.

In the event the web server computer 230 is not what it purports to be or there is a man-in-the-middle attack (see 250) between the web browser 220 and the web server computer 230, the certificate information received in the client computer 200 will not match that in the local CV database 222. In that case, the SSL certificate will fail verification. In response to the failed verification of the SSL certificate or if the web server computer 230 is identified to be malicious, the CV client module 223 may instruct the hook module 221 (arrow 206) or other module to block communications with the web server computer 230.

Having the CV client module 223 perform the certificate verification independent of the web browser 220 provides many advantages heretofore unrealized. Because the web browser 220 is typically a commercially available browser and needs to be compatible with a variety of websites, it is generally susceptible to attacks. For example, a virus, Trojan, or other malicious code may taint the local certificate store used by the web browser 220. Furthermore, since the CV client module 223 can perform a more accurate verification by having certificate information of legitimate web server computers in the local CV database 222, the CV client module 223 can block or initiate blocking of communications upon detection of certificates that fail verification without giving the user the option to continue the communications.

FIG. 3 schematically shows a computing environment in accordance with another embodiment of the present invention. In the example of FIG. 3, the CV client module 223 consults a remotely located (i.e., external to the client computer 200) security server computer 340, rather than the local CV database 222, to verify a digital certificate or to determine if a web server computer is malicious.

In the example of FIG. 3, the security server computer 340 comprises a server computer hosting a CV server module 342. The CV server module 342 may comprise computer-readable program code for verifying a digital certificate, which in this example comprises an SSL certificate. In one embodiment, the CV server module 342 is configured to receive a request for verification from the CV client module 223. The request for verification may include certificate information extracted by the hook module 221. The CV server module 342 may be configured to retrieve certificate information of the web server computer from the web server computer itself, which may be obtained on the fly from the web server computer or as stored in the local datastore 341 (e.g., cache or database). The CV server module 342 may compare the certificate information received from the CV client module 223 with that from the web server computer itself. If the certificate information received from the CV client module 223 does not match that obtained from the web server computer itself, the CV server module 341 may so inform the CV client module 223. In that case, the CV client module 223 may deem the SSL certificate to fail the verification process and block or initiate blocking of the encrypted communication.

The local datastore 341 may also contain IP addresses and other server information of known malicious web server computers. The CV server module 342 may compare the IP address and server identity included in the request for verification received from the CV client module 223 with those stored in the local datastore 341 to determine if the web server computer 230 is a malicious web server computer.

In an example operation, a user of the client computer 200 may employ the web browser 220 to surf the Internet and connect to a website hosted by the web server computer 230. The hook module 221 monitors communications between the web browser 220 and the web server computer 230 (arrows 301 and 303). Before encrypted communication occurs between the web browser 220 and the web server computer 230, the web server computer 230 provides its SSL certificate to the web browser 220. The hook module 221 extracts the SSL certificate and other certificate information from communications between the web browser 220 and the web server computer 230. The hook module 221 provides the certificate information, which includes the SSL certificate, IP address, and server identity of the web server computer 230, to the CV client module 223 (arrow 303).

The CV server module 342 may compare the IP address and server identity of the web server computer 230 against those of malicious web server computers stored in the local CV database 222 to determine if the web server computer 230 is malicious.

To verify the SSL certificate, the CV client module 223 sends a request for verification to the CV server module 342 (arrow 304). The request for verification may include the certificate information extracted by the hook module 221 from communications between the web browser 220 and the web server computer 230. From the certificate information in the request for verification, the CV server module 341 identifies the owner of the SSL certificate, which in this example is supposedly from the web server computer 230. The CV server module 341 obtains the SSL certificate of the web server computer 230 from the web server computer 230 itself (arrow 305), rather than from the CV client module 223.

Generally speaking, a man-in-the-middle attack involves eavesdropping of computer communications by placing itself in the middle of a communications channel between two computers. In a typical application, the communications channel employed by the security server computer 340 to communicate with the web server computer 230 will be different from that between the client computer 200 and the web server computer 230. This advantageously allows the security server computer 340 to bypass any man-in-the-middle attacks (see 250) that may be occurring between the client computer 200 and the web server computer 230.

Still referring to FIG. 3, the CV server module 342 compares the SSL certificate it received from the web server computer 230 against the SSL certificate included in the request for verification received from the CV client module 223. The CV server module 342 sends the result of the comparison of the SSL certificates to the CV client module 223 (arrow 306). If the result of the comparison indicates that the SSL certificates do not match, the CV client module 223 may deem that a man-in-the-middle attack is occurring or that the web server computer 230 is being spoofed. In that case, the SSL certificate verification fails. In response to the failed verification or if the web server computer 230 is deemed malicious, the CV client module 223 may instruct the hook module 221 (arrow 307) or other module to block communications with the web server computer 230.

As can be appreciated, the digital certificate verification system of FIG. 3 advantageously provides a more secure encrypted communication because it would be mode difficult for a cyber criminal, such as a hacker, to attack a dedicated security server computer compared to a user client computer.

Digital certificate verification methods and systems have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of verifying a digital certificate used for encrypted computer communications, the method comprising:
    monitoring communications between a web browser in a client computer and a web server computer;
    in the client computer, extracting a digital certificate from the communications before the digital certificate is received by the web browser;
    before the digital certificate is received by the web browser, performing a verification of the digital certificate in the client computer to verify that the web server computer is legitimate according to a trusted third party that provided the digital certificate, wherein the verification of the digital certificate is performed independent of the web browser; and
    blocking subsequent communications between the web browser and the web server computer when the digital certificate fails the verification,
    wherein the digital certificate comprises an SSL (secure socket layer) certificate and the trusted third party comprises a certification authority,
    wherein performing verification of the digital certificate comprises: providing the digital certificate to a remotely located security server computer over a computer network, and receiving a result of a comparison of the digital certificate to another digital certificate obtained by the remotely located security server computer from the web server computer.

2. The method of claim 1 wherein the subsequent communications between the web browser and the web server computer are blocked without giving an option for a user to continue communicating with the web server computer when the digital certificate fails the verification.

3. The method of claim 1 wherein performing verification of the digital certificate comprises:
    comparing the digital certificate against contents of a local database in a same computer as the web browser.

4. The method of claim 1 further comprising:
extracting an IP (Internet protocol) address of the web server computer from the communications; and
comparing the IP address to IP addresses of known malicious web server computers.

5. The method of claim 1 wherein the remotely located security server computer compares an IP address of the web server computer to IP addresses of known malicious web server computers.

6. The method of claim 1 wherein the remotely located security server computer obtains the other digital certificate by requesting the other digital certificate from the web server computer.

7. A system for verifying a digital certificate used for encrypted computer communications, the system comprising:
a client computer running a web browser, the client computer being configured to verify independent of the web browser an SSL (secure socket layer) certificate extracted from communications between the web browser and a web server computer before the SSL certificate is received by the web browser, the client computer being configured to block subsequent communications between the client computer and the web server computer without giving a user an option to continue communicating with the web server computer when the SSL certificate fails the verification; and
a security server computer in communication with the client computer over a computer network, the security server computer being configured to receive the SSL certificate from the client computer and compare the SSL certificate to another SSL certificate obtained by the security server computer from the web server computer,
wherein the security server computer is configured to compare an IP (Internet protocol) address of the web server computer against IP addresses of malicious web server computers.

8. The system of claim 7 further comprising:
an update server computer configured to provide updates to a local database of the client computer, the updates comprising information used by the client computer to verify SSL certificates the client computer obtains from web server computers.

9. The system of claim 7 wherein the client computer is running a hook module and a certificate validation module, the hook module being configured to monitor the communications between the web browser and the web server computer, to extract the SSL certificate from the communications, and to provide the SSL certificate to the certificate validation module for verification independent of the web browser.

10. The system of claim 9 wherein the certificate validation module is configured to compare the SSL certificate of the web server computer to SSL certificates of legitimate web server computers.

11. The system of claim 9 wherein the hook module is configured to extract the IP address of the web server computer and provide the IP address of the web server computer to the certificate validation module for comparison to IP addresses of known malicious web server computers.

12. A method of verifying a digital certificate used for encrypted computer communications, the method comprising:
extracting an SSL (secure socket layer) certificate from communications between a web browser in a client computer and a web server computer before the SSL certificate is received by the web browser;
before the SSL certificate is received by the web browser, performing verification of the SSL certificate in the client computer independent of the web browser; and
blocking further communications between the web browser and the web server computer when the SSL certificate fails the verification,
wherein performing the verification of the SSL certificate comprises: providing the SSL certificate to a remotely located server computer over a computer network; and comparing the SSL certificate to another SSL certificate obtained directly from the web server computer and not through a client computer running the web browser.

13. The method of claim 12 further comprising:
comparing an IP address of the web server computer to IP addresses of known malicious web server computers to determine if the web server computer is malicious.

14. A method of verifying a digital certificate used for encrypted computer communications, the method comprising:
extracting an SSL (secure socket layer) certificate from communications between a web browser in a client computer and a web server computer before the SSL certificate is received by the web browser;
before the SSL certificate is received by the web browser, performing verification of the SSL certificate in the client computer independent of the web browser; and
blocking further communications between the web browser and the web server computer when the SSL certificate fails the verification,
wherein performing the verification of the SSL certificate comprises: comparing the SSL certificate to contents of a local database containing SSL certificates of legitimate web server computers.

15. The method of claim 14 further comprising:
comparing an IP address of the web server computer to IP addresses of known malicious web server computers to determine if the web server computer is malicious.

* * * * *